United States Patent [19]
Takekoshi et al.

[11] Patent Number: 4,769,424
[45] Date of Patent: Sep. 6, 1988

[54] POLYARYLENE SULFIDE BLOCK COPOLYMERS, METHOD FOR MAKING, AND USE

[75] Inventors: Tohru Takekoshi, Scotia; Patricia P. Anderson, Albany, both of N.Y.

[73] Assignee: General Electric Company, Schenectady, N.Y.

[21] Appl. No.: 56,198

[22] Filed: Jun. 1, 1987

[51] Int. Cl.$^4$ .................. C08L 77/06; C08L 81/02
[52] U.S. Cl. .................................. 525/435; 525/436; 525/537; 525/420
[58] Field of Search ............... 525/420, 436, 537, 435

[56] References Cited

U.S. PATENT DOCUMENTS 3,847,870 11/1974 Takekoshi ................. 260/47 CP
3,850,885 11/1974 Takekoshi ................. 260/47 CZ
4,455,410 6/1984 Giles, Jr. ........................ 525/537

OTHER PUBLICATIONS

Short, J. N./Hill, Jr., H. W., "Polyphenylene Sulfide Coating and Molding Resins", Chemtech, 483 (Aug. 1972), pp. 481-485.
Hill, Jr., H. W., "A New High Molecular Weight Polyphenylene Sulfide", Ind. Eng. Chem. Prod. Res. Dev., vol. 18, No. 4 (1979), pp. 252-253.
Brady, D. G., "Poly(Phenylene Sulfide)—How, When, Why, Where, and Where Now", Journal of Applied Polymer Science: Applied Polymer Symposium, 36 (1981), pp. 231-239.
Hill, Jr., H. W., "Polymers Containing Sulfur", Encyclopedia of Chemical Technology, 18 (1982), pp. 793-814.
Daccord, G./Sillion, B., "α,ω-Difunctionalized Poly(-p-Thiophenylene) Oligomers, Synthesis and Properties", Polymer Bulletin, 4 (191), pp. 459-466.
Daccord, G./Sillion, B., "Oligo(Thiophenylenes-1,4) α,ω-Difonctionnalises, 3", Makromol. Chem., 184 (1983), pp. 1861-1867.

*Primary Examiner*—John C. Bleutge
*Assistant Examiner*—David W. Woodward
*Attorney, Agent, or Firm*—William A. Teoli; James C. Davis, Jr.; James Magee, Jr.

[57] ABSTRACT

Block copolymers of polyarylene sulfide with either polyimide, or polydiorgano siloxane are provided. Various methods for making such block copolymers are shown which are useful as compatabilizers for blends of polyarylene sulfide with polyimides and polydiorgano siloaxanes.

3 Claims, No Drawings

POLYARYLENE SULFIDE BLOCK COPOLYMERS, METHOD FOR MAKING, AND USE

BACKGROUND OF THE INVENTION

The present invention relates to block copolymers of polyarylene sulfide, such as polyphenylene sulfide, chemically combined with blocks of polyetherimide or polydiorganosiloxane. The block copolymers can be used as high performance injection moldable thermoplastics. In addition, the block copolymers can be used as compatibilizers for blends of polyarylene sulfide with other polymers such as polyetherimides and polydiorganosiloxanes.

Prior to the present invention, it was generally known that polyarylene sulfides, such as polyphenylene sulfide, were highly crystalline engineering thermoplastics (MP 285° C.). Because of their crystallinity, polyarylene sulfides are extremely resistant to aggressive solvents, including dipolar solvents and chlorinated hydrocarbons. However, because of their low glass transition temperatures, for example polyphenylene sulfide has a Tg of 85° C., these potentially valuable thermoplastics show relatively low heat deflection temperature (HDT of 105° C.) without any reinforcement, such as fillers and fibers. Block copolymers of polyphenylene sulfide, for example polyphenylene sulfidepolyamide block polymers are shown by Macromol. Chem., 184 1861 (1983) and Polym. Bulletin, 6, 477 (1982).

The present invention is based on our discovery that polyarylene sulfide block copolymers, such as polyarylene sulfide-polyimide block copolymers and polyarylene sulfide-polydiorganosiloxane block copolymers can be made having significantly improved heat distortion temperature compared to polyarylene sulfide homopolymer.

STATEMENT OF THE INVENTION

There is provided by the present invention block copolymers comprising by weight, (A) 1 to 99% of polyarylene sulfide blocks chemically combined with, (B) 99 to 1% of blocks selected from the class consisting of, (i) polyetherimide, and
(ii) polydiorganosiloxane.

The polyarylene sulfide which can be used in the practice of the invention can be made by the procedure shown by G. Daccord and B. Sillion, Polym. Bulletin, 4, 459 (1981). For example, reaction can be effected between an alkali metal sulfide and an excess molar quantity of a dihalodiaryl sulfide to make a halogen-terminated polyarylene sulfide of the formula,

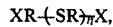  (1)

where R is a $C_{(6-14)}$ arylene radical, or $C_{(6-14)}$ arylene radical substituted with radicals inert during displacement, X is a halogen radical, such as chloro, and n is an integer having a value of from 0 to 50, inclusive. Amino-terminated polyarylene sulfide can be made by effecting reaction between halogen-terminated polyarylene sulfide of formula (1) and an amino thio-arylol, for example p-aminothiophenol, of the formula,

  (2)

in the presence of an acid acceptor, such as an alkali metal carbonate to produce the corresponding amino-terminated polyarylene sulfide having the formula,

  (3)

where R and n are as previously defined.

One method of preparing the polyarylene sulfide block copolymers of the present invention is by effecting reaction at a temperature of 100° C. to 300° C. in the presence of an inert organic solvent between the amino-terminated polyarylene sulfide of formula (3) and an aromatic bisetheranhydride of the formula,

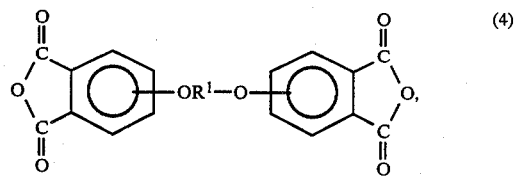  (4)

which can be utilized in further combination with either aryldiamine of the formula,

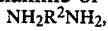  (5)

amino-terminated polydiorganosiloxane of the formula,

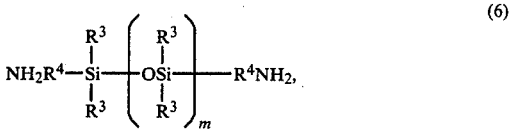  (6)

or a mixture thereof, where $R^1$ is a $C_{(6-30)}$ divalent aromatic organic radical, $R^2$ is a $C_{(6-30)}$ divalent aromatic radical, $R^3$ is a $C_{(1-14)}$ monovalent hydrocarbon radical or $C_{(1-14)}$ monovalent hydrocarbon radical substituted with radicals inert during condensation or displacement reactions, $R^4$ is a $C_{(1-8)}$ divalent hydrocarbon radical, and m is an integer equal to from 1 to 200 inclusive.

An alternative method of making polyarylene sulfide block copolymers is by effecting an imideamine exchange reaction at a temperature of 100° C. to 300° C. between aromatic bisetheranhydride of formula (4), diarylamine of formula (5), and an imide-terminated arylene sulfide oligomer of the formula,

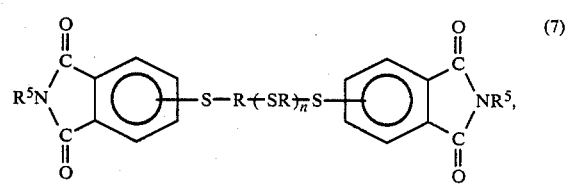  (7)

where R and n are as previously defined and $R^5$ is a $C_{(1-14)}$ monovalent hydrocarbon radical, or a 5- or 6-membered ring containing heterocyclic nitrogen radical.

Another alternative method of making polyarylene sulfide block copolymers is the reaction of imide-terminated arylene sulfide oligomer of formula (7) and amine terminated polyimide of formula (8),

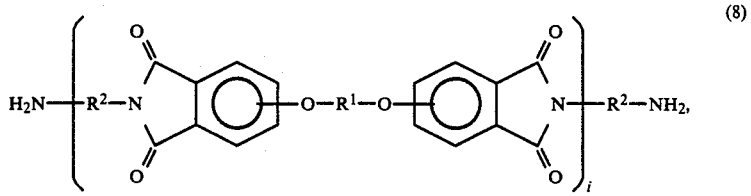
(8)

where $R^1$ and $R^2$ are defined as above, and i is an integer from 1 to 50.

Radicals included with an R of formulas (1-3) and (7) are, for example, divalent $C_{(6-14)}$ arylene radicals such as phenylene, tolylene, xylylene, napththylene, biphenylene, anthrylene, and such divalent arylene radicals substituted with monovalent radicals inert during the condensation or displacement reactions. Radicals which are included within $R^1$ of formulas (4) and (8) are, for example, (a) the following divalent organic radicals,

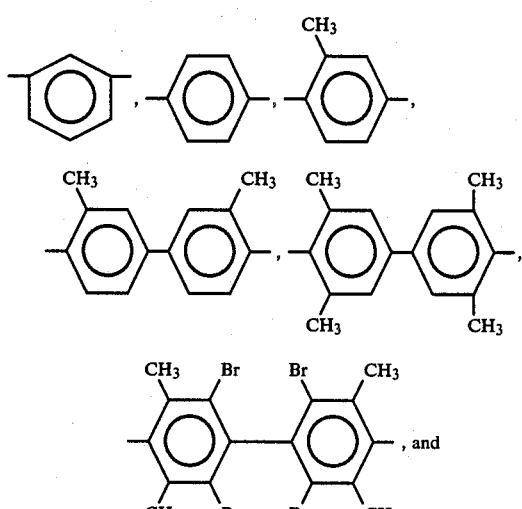

and (b) divalent organic radicals of the general formula,

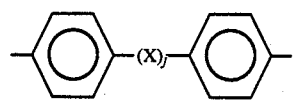

where X is a member selected from the class consisting of divalent radicals of the formulas,

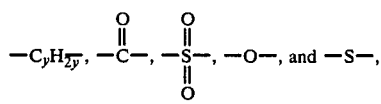

where j is 0 or 1, y is a whole number from 1 to 5.

Radicals which are included within $R^2$ of formulas (5) and (8) are, for example, $C_{(6-30)}$ divalent arylene radicals such as phenylene, tolylene, xylylene, naphthylene, biphenylene, and anthrylene. In addition, $R^2$ also can be radicals included within the group,

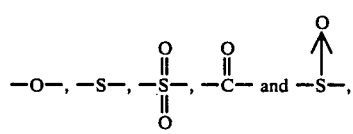
(9)

where Y is selected from

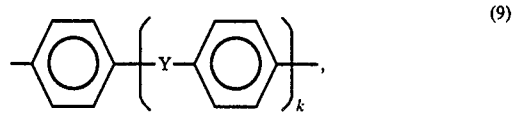

and k is an integer 1 to 4.

Radicals included within $R^3$ of formula (6) are, for example, $C_{(1-14)}$ monovalent hydrocarbon radicals such as alkyl radicals, for example, methyl, ethyl, propyl, butyl, pentyl, hexyl; monovalent aryl radicals such as phenyl, tolyl, xylyl, naphthyl, and derivatives of such alkyl and aryl radicals which are inert during intercondensation or displacement reactions. Radicals which are included within $R^4$ of formula (6) are, for example, $C_{(1-14)}$ divalent hydrocarbon radicals such as methylene, dimethylene, trimethylene, tetramethylene, pentamethylene, hexamethylene, and divalent arylene radicals such as phenylene, xylylene, tolylene, naphthylene, and alkylaryl radicals, such as dimethylenephenylene, trimethylenephenylene. Radicals which are included within $R^5$ of formula (7) are, for example, monovalent hydrocarbon radicals and substituted monovalent hydrocarbon radicals, as shown for $R^3$ and monovalent heterocyclic radicals such as pyridyl.

Imide-terminated polyarylene sulfide of formula (7) can be made by effecting reaction between N-organophthalimide-3- or 4-thiolate of the formula,

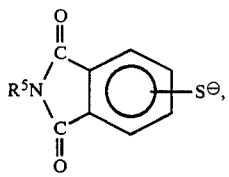

(10)

and halogen-terminated polyarylene sulfide of formula (1) in the presence of an alkali metal carbonate. The N-organophthalimidethiolate of formula (10) can be made by a sulfide exchange reaction between the corresponding bis-N-organophthalimido sulfide and sodium sulfide or a displacement reaction between 3- or 4-halo-N-organo-phthalimide and sodium sulfide in a dipolar inert organic solvents which can be used to make the block copolymers of the present invention by intercondensation of amine and anhydride are, for example, aprotic solvents, such as N-methylpyrrolidone.

The polyarylene sulfide block copolymers of the present invention can be used as high performance injection moldable thermoplastics. In addition, these block copolymers can be used as compatibilizers for blends of polyarylene sulfide with other thermoplastic materials such as polyetherimides and polyimides.

The following examples are given by way of illustration and not by way of limitation. All parts are by weight.

EXAMPLE 1

A mixture of 8.4656 grams (0.10845 mole) of anhydrous sodium sulfide, 43.5345 grams (0.12656 mole) of 4,4'-dibromodiphenyl sulfide and 100 ml of N-methylpyrrolidone, stirred and heated to reflux (203° C.) under a nitrogen atmosphere over a period of 3 hours. Reaction mixture was poured into water and the product was collected by filtration. There was obtained 30 grams of crude product which was extracted with 300 ml of hot toluene. The yield of the toluene-insoluble oligomer was 25.3 grams (85.2%). Based on method of preparation and elemental analysis, the product was a bromo-terminated polyphenylene sulfide oligomer having the formula,

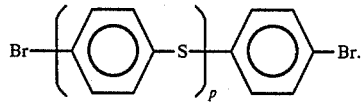

The bromine content of the oligomer was 11.9% by weight.

There were added 5.3 grams (0.038 mole) of anhydrous potassium carbonate and 4.00 grams (0.03192 mole) of para-aminothiophenol to a mixture of 24.56 grams of the above bromo-terminated polyphenylene sulfide in 100 ml of N-methylpyrrolidone at a temperature of 160° C. under a nitrogen atmosphere. The resulting mixture was stirred at 30° C. for one hour and then 140°–150° C. for 1.5 hours. The reaction mixture was then heated to 220° C. over a period of 15 minutes and maintained at 200° C. for 20 minutes. The resulting solution was cooled and added to 400 ml of water. The precipitated product was filtered, washed with water, and then with methanol and dried under vacuo. There was obtained 24.93 grams of product. Based on method of preparation, the product was an amino-terminated polyphenylene sulfide having the formula,

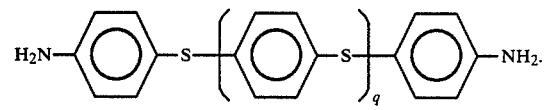

The identity of the above product was further confirmed by N-group analysis which showed 0.823 milliequivalent of amino groups present per gram of the oligomer.

A mixture of 5.008 grams (4.121 milli equivalence) of the amino-terminated polyphenylene sulfide oligomer, 4.580 grams (8.800 millimole) of 2,2-bis[4-(3,4-dicarboxyphenoxy)-phenyl]propane dianhydride (bisphenol-A dianhydride), 0.7287 grams (6.738 millimoles) of meta-phenylenediamine and 15 ml of N-methylpyrrolidone was stirred under nitrogen and heated to 200° C. over a period of 45 minutes. The temperature of the mixture was maintained at 200° C. for 5 minutes and the solution was cooled to 120° C. Approximately 10 ml of toluene was added and one quarter was removed as a water-toluene azeotrope. The remaining toluene was distilled off over a period of 30 minutes to form a very viscous solution. The solution was diluted with 25 ml of N-methylpyrrolidone and cooled. Product precipitated when the mixture was added to methanol which was recovered and dried. There was obtained 9.79 grams. Based on method of preparation, the product was a block copolymer of polyphenylenesulfide and polyetherimide consisting essentially of chemically combined units of the formula,

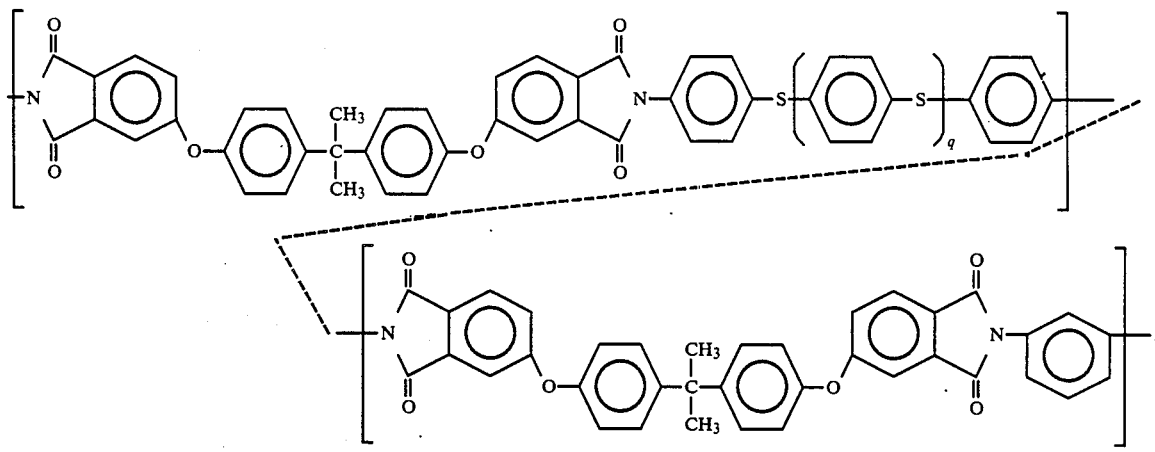

Identity of the above block copolymer was confirmed by elemental analysis calculated: C, 70.81; hydrogen, 3.91; nitrogen, 2.36 found: carbon 70.69; hydrogen, 4.07; nitrogen, 2.21.

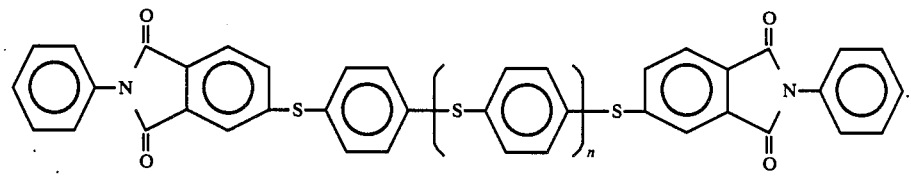

The block copolymer had a $T_g$ of 193° C. and a $T_m$ of 268° C. TGA curves measured at 10°/minute in air showed 1% weight loss at 460° C. and 10% loss at 530° C. Approximately a 10% solution of the polymer in N-cyclohexylpyrrolidone was prepared at 200° C. and the solution was cast on a glass plate heated at 220° C. The solvent was evaporated by raising the temperature to 300° C. over a period of one hour. A strong flexible film was obtained. The film was not soluble in dimethylformamide and dimethylsulfoxide but swelled in chloroform and methylenechloride. The block copolymer is found to be an injection moldable thermoplastic; it is useful as a compatibilizer for blends of polyetherimide and polyphenylene sulfide.

EXAMPLE 2

A mixture of 3.3339 grams (0.04271 mole) of anhydrous sodium sulfide, 5.0876 grams (0.010677 mole) of bis(N-phenylphthalimido)sulfide and 25 ml of N-methylpyrrolidone was stirred and heated at 100° C. for 40 minutes. There was formed N-phenylphthalimide-4-thiolate as confirmed by HPLC analysis.

There was added 14.6953 grams (0.04271 mole) of 4,4'-dibromodiphenyl sulfide to the above thiolate solution and the resulting mixture was heated for 5 hours at 212° C. The mixture was then cooled and poured into water. The resulting product was filtered and washed with water followed by methanol and dried. The yellow powder was obtained which weighed 14.15 grams (98.8%). Based on method of preparation, the product was an oligomer having the formula,

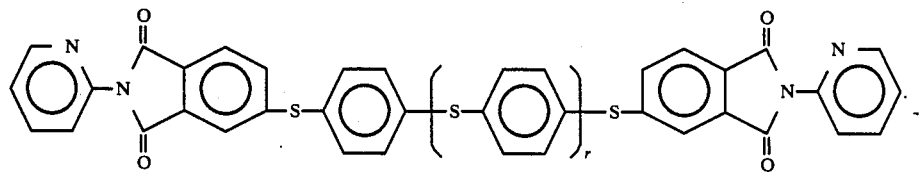

Identity of the product was further confirmed by its IR spectrum which showed characteristic absorptions at 1715 and 1775 cm$^{-1}$ for imide groups and at 1470, 1100, 1010 and 820 cm$^{-1}$ for polyphenylene sulfide groups.

In accordance with the above procedure, a mixture of 11.482 grams (0.03336 moles) of 4,4-dibromodiphenyl sulfide, 2.930 grams (0.03753 moles) of anhydrous sodium sulfide was stirred under nitrogen and heated at 220° C. for 1.5 hours. The mixture was cooled and 2.157 grams (0.00834 mole) of N(2-pyridyl)-4-chlorophthalimide was added and the resulting mixture was reheated to 220° C. for 4 hours. The reaction mixture was cooled and poured into water. Product precipitated which was filtered, washed with water, and then with methanol and dried. The crude product was extracted with hot methanol and redried. Yield of product was 8.57 grams (93%). Based on method of preparation, the product was a phenylene sulfide oligomer having the formula, The identity of the product was further confirmed by its IR spectra 1725 and 1780 cm$^{-1}$ for imide groups, 1470, 1100, 1010, and 820 cm$^{-1}$ for polyphenylene sulfide groups.

Polyphenylene sulfide polyimide block copolymer using one of the above imide-terminated polyphenylene sulfide oligomers is made by the following procedures:

a mixture containing the above N-2-pyridylimide-terminated oligomer (5.520 g, 2.50 mmols), 1,4-bis(3,4- was polyphenylene sulfide polydimethylsiloxane block copolymer having the formula,

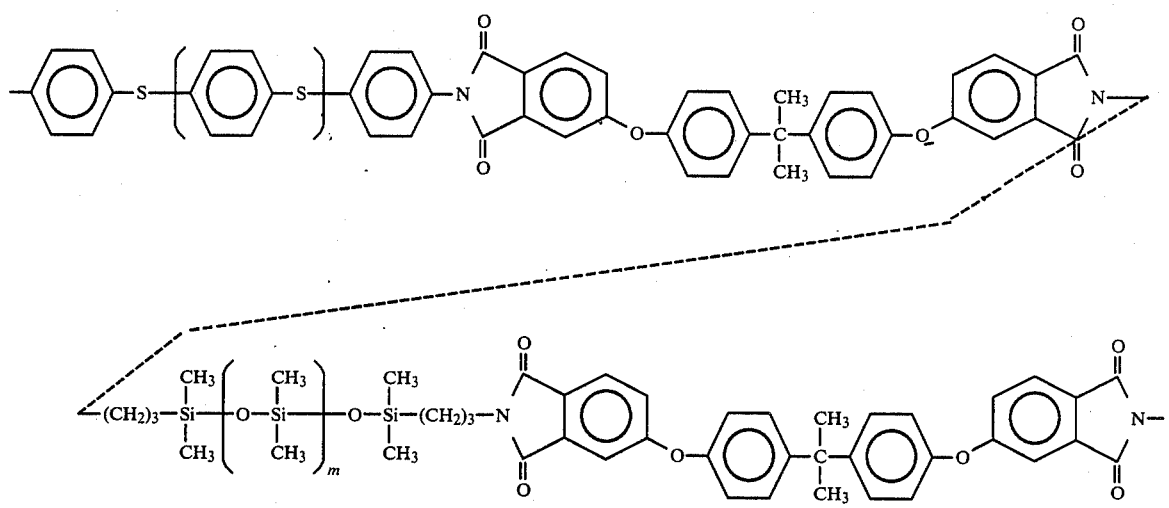

dicarboxyphenoxy)benzene dianhydride (3.643 g, 9.06 mmole), 4,4'-diaminodiphenyl ether (2.313 g, 11.55 mmole) and 65 ml of N-methylpyrrolidone was stirred and heated to reflux under nitrogen. The heating was continued for 2 hours during which time 15 ml of the solvent was distilled off together with the water of condensation. The solution was cooled and poured into methanol. The precipitated block copolymer was washed with methanol and dried under vacuum. The block copolymer had a $T_g$ of 195° C. and a $T_m$ of 274° C.

EXAMPLE 3

A mixture of 3.9366 grams of polydimethylsiloxane containing 0.215 m equiv/g of γ-aminopropyl end groups, 3.9366 grams of polyphenylene sulfide having 0.8464 m equiv of amino end groups, 1.0634 grams (2.043 millimoles) of bisphenol-A dianhydride, 20 ml of N-methylpyrrolidone, and 4 ml of toluene was stirred under nitrogen and heated to reflux. Water was azeotropically removed and the toluene was distilled off to raise the temperature to 200° C. The solution was heated at 200° C. for 1.5 hours and cooled. Product was precipitated by pouring the mixture into 50 ml of acetone. There was obtained 8.4 grams of a white fibrous elastomer. The product had a $T_g$ of 108° C. and a $T_m$ of 267° C. Based on method of preparation the product The block copolymer is found to be useful as a compatibilizer for silicone polyarylene sulfide blends.

While the above examples are directed to only a few of the very many variables which can be used in the practice of the methods of the present invention, it should be understood that the present invention is directed to several additional methods and to a much broader variety of polyarylene sulfide block copolymers as shown in the description proceeding these examples.

What is claimed and sought to be protected by Letters Patent of the United States is as follows:

1. Block copolymers comprising by weight,
   (A) 1 to 99% of polyarylene sulfide blocks intercondensed through imide linkages with,
   (B) 99 to 1% of polyaromaticetherimide blocks.

2. A block copolymer in accordance with claim 1, where the polyaromaticetherimide block is the intercondensation product of 2,2-bis[4-(3,4-dicarboxyphenoxy)phenyl]propane dianhydride and methaphenylenediamine.

3. A block copolymer in accordance with claim 1, where the polyarylene sulfide block is a polyphenylene sulfide block.

* * * * *